United States Patent
Bensch et al.

(10) Patent No.: US 11,400,906 B2
(45) Date of Patent: Aug. 2, 2022

(54) ELECTROPNEUMATIC PARKING BRAKE WITH DIRECTLY CONTROLLED VALVES

(71) Applicant: WABCO GmbH, Hannover (DE)

(72) Inventors: Uwe Bensch, Hannover (DE); Julian Van Thiel, Hannover (DE)

(73) Assignee: WABCO GmbH, Hannover (DE)

( * ) Notice: Subject to any disclaimer, the term of this patent is extended or adjusted under 35 U.S.C. 154(b) by 224 days.

(21) Appl. No.: 16/638,811

(22) PCT Filed: May 29, 2018

(86) PCT No.: PCT/EP2018/064013
§ 371 (c)(1),
(2) Date: Feb. 13, 2020

(87) PCT Pub. No.: WO2019/034295
PCT Pub. Date: Feb. 21, 2019

(65) Prior Publication Data
US 2020/0189545 A1 Jun. 18, 2020

(30) Foreign Application Priority Data
Aug. 16, 2017 (DE) .................... 10 2017 007 780.0

(51) Int. Cl.
*B60T 13/68* (2006.01)
*B60T 13/66* (2006.01)
(Continued)

(52) U.S. Cl.
CPC .......... *B60T 13/683* (2013.01); *B60T 13/662* (2013.01); *B60T 8/327* (2013.01); *B60T 13/263* (2013.01);
(Continued)

(58) Field of Classification Search
CPC ...... B60T 8/327; B60T 13/263; B60T 13/385; B60T 13/662; B60T 13/683; B60T 7/20;
(Continued)

(56) References Cited

U.S. PATENT DOCUMENTS 8,651,588 B2 * 2/2014 Bensch ................... B60T 8/327
303/7
8,708,430 B2 * 4/2014 Bensch ................. B60T 17/083
303/113.4

(Continued)

FOREIGN PATENT DOCUMENTS

DE 10336611 A1 3/2005
DE 102007004759 A1 8/2008
(Continued)

OTHER PUBLICATIONS

English machined translation of Description of EP2939892 A1. (Nov. 4, 2015).*
(Continued)

*Primary Examiner* — Robert A. Siconolfi
*Assistant Examiner* — San M Aung
(74) *Attorney, Agent, or Firm* — Dickinson Wright PLLC

(57) ABSTRACT

An electropneumatic parking brake module (1) includes a supply connection (2), a spring-type actuator connection (4), an inlet-outlet valve unit (10) having a first switching position and a second switching position, and an electropneumatic pilot control unit (12) for outputting at least a first control pressure (p1) at the inlet-outlet valve unit (10). In the first switching position of the inlet-outlet valve unit (10), a spring brake pressure (pF) can be fed through directly from the supply connection (2) to the spring-type actuator connection (4) by virtue of the fact that the spring-type actuator connection (4) is connected to the supply connection (2), and, in the second switching position of the inlet-outlet valve
(Continued)

unit (10), when the first control pressure (p1) is below a first threshold value, the spring-type actuator connection (4) is connected to a ventilating connection (14.3) of the inlet-outlet valve unit (10).

32 Claims, 7 Drawing Sheets

(51) Int. Cl.
    *B60T 8/32*         (2006.01)
    *B60T 13/26*       (2006.01)
    *B60T 13/38*       (2006.01)
    *B60T 15/04*       (2006.01)

(52) U.S. Cl.
    CPC ............ *B60T 13/385* (2013.01); *B60T 15/041* (2013.01); *B60T 2270/413* (2013.01)

(58) Field of Classification Search
    CPC ................ B60T 17/221; B60T 15/041; B60T 2270/413; B60T 13/261; B60T 13/38; B60Y 2200/148; B60Y 2400/81; B60Y 2400/306; B60Y 2300/28
    USPC ............................................................ 303/3
    See application file for complete search history.

(56) References Cited

U.S. PATENT DOCUMENTS

| | | | |
|---|---|---|---|
| 8,926,026 B2* | 1/2015 | Vuckovic | B60T 13/385 |
| | | | 303/3 |
| 9,725,080 B1 | 8/2017 | Wright et al. | |
| 2008/0030068 A1* | 2/2008 | Bensch | B60T 13/04 |
| | | | 303/17 |
| 2010/0078988 A1* | 4/2010 | Bensch | B60T 13/588 |
| | | | 303/3 |
| 2014/0103237 A1* | 4/2014 | Herges | B60T 13/683 |
| | | | 251/129.01 |
| 2017/0066420 A1 | 3/2017 | Leinung et al. | |

FOREIGN PATENT DOCUMENTS

| | | |
|---|---|---|
| DE | 102008007877 B3 | 11/2009 |
| DE | 102009059816 B3 | 4/2011 |
| DE | 102009059900 A1 | 6/2011 |
| DE | 102010054711 A1 | 6/2012 |
| DE | 102014006614 A1 | 11/2015 |
| DE | 102015106146 A1 | 10/2016 |
| DE | 102015106150 A1 | 10/2016 |
| DE | 102015214037 A1 | 1/2017 |
| EP | 2055541 A1 | 5/2009 |
| EP | 2129562 A2 | 12/2009 |
| EP | 2384944 A2 | 11/2011 |
| EP | 2576301 A1 | 4/2013 |
| EP | 2821303 A1 | 1/2015 |
| EP | 2939892 A1 | 11/2015 |
| EP | 3668767 A1 | 6/2020 |
| WO | 2008085140 A1 | 7/2008 |
| WO | 2008122382 A1 | 10/2008 |
| WO | 2014009457 A1 | 1/2014 |
| WO | 2014094936 A1 | 6/2014 |

OTHER PUBLICATIONS

European Patent Office, Rijswijk, Netherlands, International Search Report of International Application No. PCT/EP2018/064013, dated Sep. 10, 2018, 2 pages.

* cited by examiner

ELECTROPNEUMATIC PARKING BRAKE WITH DIRECTLY CONTROLLED VALVES

TECHNICAL FIELD

The present disclosure relates to an electropneumatic parking brake module.

BACKGROUND

Such electropneumatic parking brake modules, also referred to as electropneumatic handbrake modules, serve to actuate what are known as parking brakes, in general spring brakes of a pneumatic brake system for a utility vehicle.

Spring brakes can be used as parking brakes and have a fault-prone brake actuator which activates the brake in a pressure-free manner so that the vehicle is correspondingly braked in the case of the pressure-free state. In order to release the spring brakes, these are acted upon with compressed air so that the spring brakes are released counter to the force of the spring.

Such electropneumatic parking brake modules therefore generally have a supply connection for connecting a compressed air supply, and at least one spring-type actuator connection for connecting at least one spring brake cylinder. It is conceivable in this case that all of the spring brake cylinders of the utility vehicle, in particular of the power car of a traction vehicle-trailer combination, are connected to a single spring-type actuator connection of the electropneumatic parking brake module. It is also possible that separate connections are provided for this purpose.

Such electropneumatic parking brake modules generally use a relay valve in order to supply the spring-type actuator connection and thus the spring brake cylinders with a volumetric flow.

Such an electropneumatic parking brake module is disclosed, for example, in DE 10 336 611 A1. The relay valve is coupled to a pilot control unit which connects a control input of the relay valve to the supply connection via an electrically switched 2/2-way valve and a bistable 3/2-way valve. The electrically controlled 2/2-way valve serves the purpose of pulsed ventilation of the control input in order to use the spring-type actuators also for auxiliary braking or additional brake application. The bistable 3/2-way valve serves to maintain an aerated or ventilated state of the control input of the relay valve in order to maintain the state of the spring brake cylinders. In driving operation, a pressure should be permanently output at the spring-type actuator connection so that the spring brake cylinders are released. In the switched off state of the vehicle, however, the spring brake cylinders should be actuated, i.e. ventilated.

There is a need to provide electropneumatic parking brake modules which do not have a relay valve. Relay valves are generally complex to manufacture and in terms of space requirements and it is therefore desirable to be able dispense with them.

An electropneumatic parking brake module without a relay valve is disclosed in EP 2 129 562 B1. The device disclosed there solely uses a tristable solenoid valve which enables a direct connection of the supply connection to the connection for the spring brake cylinders. Such tristable solenoid valves are nevertheless extremely complex and very large, hence there is also the need here to provide a simpler solution.

An electropneumatic parking brake module is furthermore known from EP 2 939 892 A1, which module uses an electrically actuable valve apparatus which has, proceeding from the supply connection, a branch between a pneumatic line for the parking brake cylinders and a pneumatic line for the connection of a trailer control valve (TCV). A control valve is connected to the pneumatic line for the spring brake cylinders, which control valve is formed as a 3/2-way valve and has both a pneumatic and an electric control input. EP 2 939 892 A1 thus dispenses with a pilot control unit. Nevertheless, dual-acting valves which have both a pneumatic and an electric control input are also complex and a simpler solution is furthermore desired.

DE 10 2014 006 614 A1 is known from the field of service brakes. A pneumatic brake apparatus for motor vehicles is disclosed there which has a brake signal transmitter, a supply pressure accumulator and a pneumatically operable wheel brake for each wheel as well as at least one axle of the motor vehicle with in each case one electrically actuable wheel brake module for each wheel for adjusting a setpoint brake pressure of the respective wheel brake. An electronic control unit determines specified values of the setpoint brake pressures of the wheel brakes taking into account the brake signal transmitter. Each wheel brake module comprises at least one aeration valve and a ventilation valve, electrically actuable activation means for activating the aeration valve and/or the ventilation valve as well as a control logic with means for generating an actuating signal for the activation means in accordance with the specified value for the setpoint brake pressure. In order to reduce the production costs and the size of the pneumatic brake apparatus, DE 10 2014 006 614 proposes that the aeration valve and its activation means are formed in such a manner that the pneumatic pressure can be fed through from the supply pressure accumulator in the activated state of the aeration valve directly to the respective wheel brake and/or the ventilation valve vents the brake pressure of the wheel brake in the activated state directly into the atmosphere.

SUMMARY

It is still desirable to provide an electropneumatic parking brake module of the above-mentioned type which has a simple structure, dispenses with a relay valve and allows reliable maintenance of the state at the spring-type actuator connection.

In furtherance of this goal, the electropneumatic parking brake module of the present disclosure has a supply connection for connecting a compressed air supply, at least one spring-type actuator connection for connecting at least one spring brake cylinder, an inlet-outlet valve unit which can assume at least a first switching position and a second switching position, and an electropneumatic pilot control unit for outputting at least a first control pressure at the inlet-outlet valve unit. It is provided that, in the first switching position of the inlet-outlet valve unit, the spring-type actuator connection is connected to the supply connection for outputting a spring brake pressure, and, in the second switching position of the inlet-outlet valve unit, the spring-type actuator connection is connected to a ventilating connection of the inlet-outlet valve unit, wherein the inlet-outlet valve unit has at least a first 3/2-way valve with precisely two switching positions, and wherein the inlet-outlet valve unit is in the second switching position if the first control pressure is below a first threshold value.

In this manner, an electropneumatic parking brake module is achieved which does not require a relay valve and manages with conventional, simple valves. The inlet-outlet valve unit is preferably controlled purely pneumatically, while the pilot control unit is controlled electromagnetically.

The pilot control unit as such can be formed in general as described in DE 10 2014 006 614 A1. The pilot control unit therefore serves to output the first control pressure, wherein, depending on the first control pressure, the inlet-outlet valve unit supplies the spring-type actuator connection with a volume or ventilates it. The two defined switching positions of the 3/2-way valve are used here. The 3/2-way valve preferably serves both to aerate and ventilate the spring-type actuator connection.

According to the present disclosure, it is furthermore provided that the inlet-outlet valve unit is in the second switching position if the first control pressure is below a first threshold value. The threshold value is predetermined and structurally defined by the inlet-outlet valve unit. A typical threshold value lies in the region of 0.25 MPa, but can be freely defined and selected in accordance with the respective requirements of the brake system in which the electropneumatic parking brake module is supposed to be used. In this manner, it is ensured that if no first control pressure can be output, this therefore lies below the first threshold value, the spring-type actuator connected is ventilated and the spring brake cylinders can thus be actuated. This is advantageous particularly if the pilot control unit is formed so that it does not output any first control pressure in the currentless state.

In the first switching position of the inlet-outlet valve unit, the spring brake pressure can preferably be fed through directly from the supply connection to the spring-type actuator connection. In the present case, direct feeding through refers to the production of a volume connection between the supply connection and the spring-type actuator connection, without the interconnection of a relay valve. Therefore, not only is a control pressure output by the inlet-outlet valve unit, rather a volumetric flow for ventilating the spring-type actuator connection is directly provided.

In one preferred embodiment, it is provided that the inlet-outlet valve unit has at least one 2/2-way check valve. The 2/2-way check valve preferably serves the purpose of graduated aeration or ventilation of the spring-type actuator connection. Via a graduated ventilating of the spring-type actuator connection, graduated brake application can be brought about by the spring brake cylinders and the spring brake cylinders can thus be used for additional braking or auxiliary braking of the vehicle. For this reason, the 2/2-way check valve is only optional.

The first 3/2-way valve is preferably controlled pneumatically. The pilot control unit is preferably formed to provide the first control pressure at the first 3/2-way valve. The 2/2-way check valve is preferably also controlled pneumatically. In one alternative, the 2/2-way check valve is formed electromagnetically. In the event that the 2/2-way check valve is formed to be pneumatically controlled, it is preferably provided that the pilot control unit provides a second control pressure at the 2/2-way check valve.

In one preferred further development, the first 3/2-way valve has an inlet connection, a working connection and a ventilating connection and the first 3/2-way valve is formed to reciprocally connect the working connection to the inlet connection and the ventilating connection. A supply pressure can preferably be output at the input connection. The input connection is preferably connected to the supply connection.

In one preferred further development, a non-return valve is arranged between the supply connection and the input connection in order to prevent a return flow from the spring-type actuator connection to the supply connection. As a result of this, it is possible to maintain a control pressure, in particular the first control pressure, even if the pressure at the supply connection drops, for example, as a result of a fault in the compressed air supply which leads to a drop in the pressure in the compressed air supply.

If, however, no non-return valve is used, it is possible to achieve an actuation of the spring brake cylinders despite the presence of the first control pressure in that the corresponding brake circuit is pumped down, i.e. the pressure in the compressed air supply is reduced and thus the present supply pressure is reduced. In this case, even if the spring-type actuator connection is connected directly to the supply connection, the spring-type actuator connection is vented through opened valves via a pumping down of the supply connection and thus the spring brake cylinders are actuated.

It is furthermore preferred that the 2/2-way check valve has a first check valve connection and a second check valve connection, wherein the first check valve connection is connected to the working connection of the first 3/2-way valve, and the second check valve connection is connected to the spring-type actuator connection. The 2/2-way check valve is therefore connected between the first 3/2-way valve and the spring-type actuator connection. For graduated aeration and ventilation, the first 3/2-way valve can then be moved into a position which connects the spring-type actuator connection to an aeration or ventilation and this connection is produced by pulsed actuation of the 2/2-way check valve. The 2/2-way check valve is preferably formed as a pneumatically controlled 2/2-way check valve, wherein it is in the open switching position if the second control pressure undershoots a second threshold value.

In one preferred further development, the electropneumatic pilot control unit has at least one second 3/2-way valve, wherein the second 3/2-way valve is provided to output the first control pressure. To this end, the second 3/2-way valve can preferably be switched between a first and a second switching position, wherein no control pressure is output in the first switching position, i.e. the corresponding input of the inlet-outlet valve unit for the first control pressure is connected to a vent, and, in a second switching position, the first control pressure is output, i.e. the corresponding input of the inlet-outlet valve unit is connected to the supply connection.

In one preferred embodiment, the second 3/2-way valve is formed as a bistable valve. In the case of the bistable valve, both the first and the second switching positions are in each case stable in a currentless state and are preferably retained by a permanent magnet. In the event of the omission of a voltage or current, such a bistable valve does not fall back into a switching position under spring load, but rather sticks in the last switching position occupied as a result of the permanent magnets. An occupied switching position can therefore be maintained by such a bistable valve, also in a currentless state, and the output first control pressure can thus be maintained in a currentless state.

The bistable valve preferably has a first bistable valve connection, a second bistable valve connection and a third bistable valve connection, wherein the first bistable valve connection is connected to the supply connection, the second bistable valve connection outputs the first control pressure and the third bistable valve connection is connected to a vent. The second bistable valve connection is preferably connected to a first control input of the first 3/2-way valve.

In further embodiments of the present disclosure, it is also possible to combine the bistable valve by a combination of monostable switching valves as well as a pneumatic self-retention in order to ensure maintenance of the output first control pressure.

Insofar as it is provided in a further embodiment that the electropneumatic pilot control unit has a monostable inlet-outlet valve combination with an inlet valve and an outlet valve for outputting the first control pressure. The first control pressure can initially be output via the monostable inlet-outlet valve combination by providing corresponding switching signals. In order to maintain this in a currentless state, a return line is preferably provided which provides the pressure output by the first 3/2-way valve as a first control pressure at the inlet-outlet valve unit. As soon as the first control pressure is output via the monostable inlet-outlet valve combination, the first 3/2-way valve switches upon exceeding of a corresponding threshold value and outputs a pressure. By returning the output pressure as a first control pressure, the switching position achieved in this manner of the 3/2-way valve can be maintained and self-retention can be achieved. A bistable valve is no longer necessary in this variant, as a result of which the costs and the installation space for the electropneumatic parking brake module can be reduced.

The pressure output by the 3/2-way valve is preferably provided as a first control pressure in a throttled manner at the inlet-outlet valve unit. The return line preferably has a throttle for this purpose.

In a first variant, the inlet valve has in this case a first inlet valve connection connected to the supply connection and a second inlet valve connection connected to the inlet-outlet valve unit, wherein the first control pressure can be output at the second inlet valve connection by switching the inlet valve. The second inlet valve connection is preferably connected via a first pneumatic control line to the first 3/2-way valve, more precisely to the first control input of the first 3/2-way valve. The inlet valve can in this case be formed either as a 2/2-way valve or as a 3/2-way valve. It is preferably formed as a 2/2-way valve and is currentless in the first, closed switching position.

It is furthermore preferred that the outlet valve has a first outlet valve connection connected to the inlet-outlet valve unit and a second outlet valve connection connected to a vent for ventilating the first control pressure. In order to move the first 3/2-way valve back into the ventilating position so that no spring brake pressure is output, it is necessary to ventilate the first control input of the first 3/2-way valve. The outlet valve which can be formed according to this embodiment as a 2/2-way valve or as a 3/2-way valve serves this purpose. The outlet valve is preferably currentless in a closed switching position if it is formed as a 2/2-way valve. The first outlet valve connection can be connected to the same first pneumatic control line as the inlet valve. A branch or a branch line can be provided for this purpose.

In one preferred further development, the return line is connected directly to the inlet-outlet valve unit. This is advantageous in particular if both the inlet valve and the outlet valve are formed as 2/2-way valves. In this variant, the return line consequently branches off directly from the second pneumatic line, which is connected to the working connection of the first 3/2-way valve and leads directly to the first control input of the first 3/2-way valve. To this end, it can discharge into the first pneumatic control line. In this variant, the pressure output by the first 3/2-way valve is provided directly and without the interconnection of a valve at the first control input of the first 3/2-way valve irrespective of the switching position of the inlet valve or of the outlet valve. A blocking-out of the returned pressure is not possible here. In order to be able to block out the returned pressure, either a further valve is required, or the inlet or outlet valve is to be formed as a 3/2-way valve.

It is accordingly provided in a further variant that the inlet valve has a third inlet valve connection connected to the return line, wherein, in a first switching position of the inlet valve, the second inlet valve connection is connected to the first inlet valve connection, and, in a second switching position of the inlet valve, the second inlet valve connection is connected to the third inlet valve connection. In this embodiment, the inlet valve is formed as a 3/2-way switching valve. The inlet valve formed as a 3/2-way valve is preferably currentless in the second switching position so that in a currentless state the returned pressure is provided as a first control pressure at the first control input of the first 3/2-way valve. Self-retention of the first 3/2-way valve is thus achieved in a currentless state.

Alternatively to this, it is also possible to form the outlet valve as a 3/2-way valve. In this variant, the outlet valve has a third outlet valve connection connected to the return line, wherein, in a first switching position of the outlet valve, the first outlet valve connection is connected to the third outlet valve connection and, in a second switching position of the outlet valve, the first outlet valve connection is connected to the second outlet valve connection. The outlet valve is preferably currentless in the first switching position so that the pressure output by the first 3/2-way valve is returned via the return line in a currentless state and is output as a first control pressure at the first control input of the first 3/2-way valve. In this manner, self-retention is achieved in a currentless state.

In the further preferred embodiment, the electropneumatic pilot control unit has at least one third 3/2-way valve for outputting a second control pressure. For this purpose, the third 3/2-way valve has an inlet connection, a working connection and a ventilating connection, and the third 3/2-way valve is formed to reciprocally connect the working connection to the inlet connection and the ventilating connection. The third 3/2-way valve is preferably formed as an electronically switched valve. In a first switching position, the input connection is preferably connected to the working connection and, in a second switching position, the ventilating connection is connected to the working connection. The third 3/2-way valve is preferably currentless in the second switching position.

It is furthermore preferred that the inlet connection of the third 3/2-way valve is connected to the supply connection, the working connection of the third 3/2-way valve is connected to a second control input of the 2/2-way check valve and the ventilating connection of the third 3/2-way valve is connected to a vent. In this case, in the currentless state, no second control pressure is output and the 2/2-way check valve is preferably in the open switching position if the second control pressure undershoots the second threshold value. A pressure in the region of approximately 0.25 MPa is in turn possible as a second threshold value, wherein other threshold values can also be used here.

In order therefore to transfer a control pressure to a trailer control valve (TCV), which control pressure corresponds to the spring brake pressure at the spring-type actuator connection, the electropneumatic parking brake module according to this embodiment has the trailer control valve connection.

The electropneumatic parking brake module preferably has a trailer valve which is connected to the trailer control valve connection and which is provided, in a first switching position, to output at least the spring brake pressure as the trailer control pressure at the trailer control connection. Alternatively, it is also possible to output another equivalent pressure at the trailer control valve connection.

The spring brake pressure is preferably provided directly at the trailer control valve connection, i.e. without inversion. The trailer control valve (TCV) connected to the trailer control valve connection must then invert the output pressure in order to provide a corresponding operating brake pressure at the service brakes of the trailer.

The trailer valve preferably has a second switching position which is provided to perform a trailer control position function. In the trailer control position, there is a check in the European trailer control as to whether the trailer-towing vehicle combination is held securely even without engaged service brakes of the trailer only as a result of the spring brake cylinders of the towing vehicle. In order to achieve this state, it is consequently necessary to output a pressure at the trailer control valve connection if the spring-type actuator connection is ventilated. The trailer control valve connected to the trailer control valve connection inverts the output pressure and thus leaves the service brakes of the trailer in a depressurized state, i.e. in an open state. The trailer control position function is only performed temporarily and is generally activated from the vehicle cabin. The vehicle driver actuates the trailer control position function in order to check the secure holding of the towing vehicle trailer combination. If it is ascertained that the towing vehicle trailer combination is securely held, the trailer control position function is terminated and the trailer valve is correspondingly moved into the first switching position so that in turn the spring brake pressure is output as the trailer control pressure at the trailer control valve connection.

In a further preferred embodiment, the trailer valve is formed as a fourth 3/2-way valve and has a first trailer valve connection, a second trailer valve connection and a third trailer valve connection, wherein the first trailer valve connection is connected to the supply connection, the second trailer valve connection is connected to the trailer control valve connection and the third trailer valve connection is connected to a branch line which branches off from a spring brake pressure line connected to the spring-type actuator connection.

It is furthermore preferred that the trailer valve is in a currentless position in the first switching position or the second switching position. In the case that the trailer valve is currentless in the first switching position, the electropneumatic parking brake module is formed for European trailer control. In the case that the trailer valve is currentless in the second switching position, the electropneumatic parking brake module is formed for Scandinavian trailer control. In the second variant, the supply pressure is output in a currentless state at the trailer control valve connection so that, in a currentless state, the operating brakes of the trailer are not applied.

It is furthermore preferred that the electropneumatic parking brake module has an electric control unit with an electric connection for receiving parking brake signals and for providing corresponding switching signals at least to the pilot control unit. The electric connection for receiving parking brake signals can be connected, for example, to a vehicle bus or directly via cabling to a parking brake switch or handbrake switch in a driver's cabin of the vehicle.

It is further preferred that the electropneumatic parking brake module has a pressure sensor which is provided to detect the spring brake pressure and provide a corresponding signal. The pressure sensor preferably provides the signal at the electric control unit. The electric control unit can transfer the signal to a vehicle bus or the like, or independently process it. It is possible to determine via the signal detected by the pressure sensor whether the spring brake cylinders are actuated or open.

Embodiments of the present disclosure will now be described below on the basis of the drawing. It is not supposed to necessarily represent the embodiments to scale, rather the drawing is, for the purpose of explanation, designed in a schematic and/or slightly distorted form. Reference is made to the current prior art in terms of additions to the teachings which are clearly apparent from the drawing. It should be taken into account that numerous modifications and changes can be made relating to the form and the detail of one embodiment without deviating from the general idea of the present disclosure. Further advantages, features and details of the present disclosure will become apparent from the following description of the preferred embodiments and on the basis of the drawings.

DETAILED DESCRIPTION OF THE DRAWINGS

Figure 1:
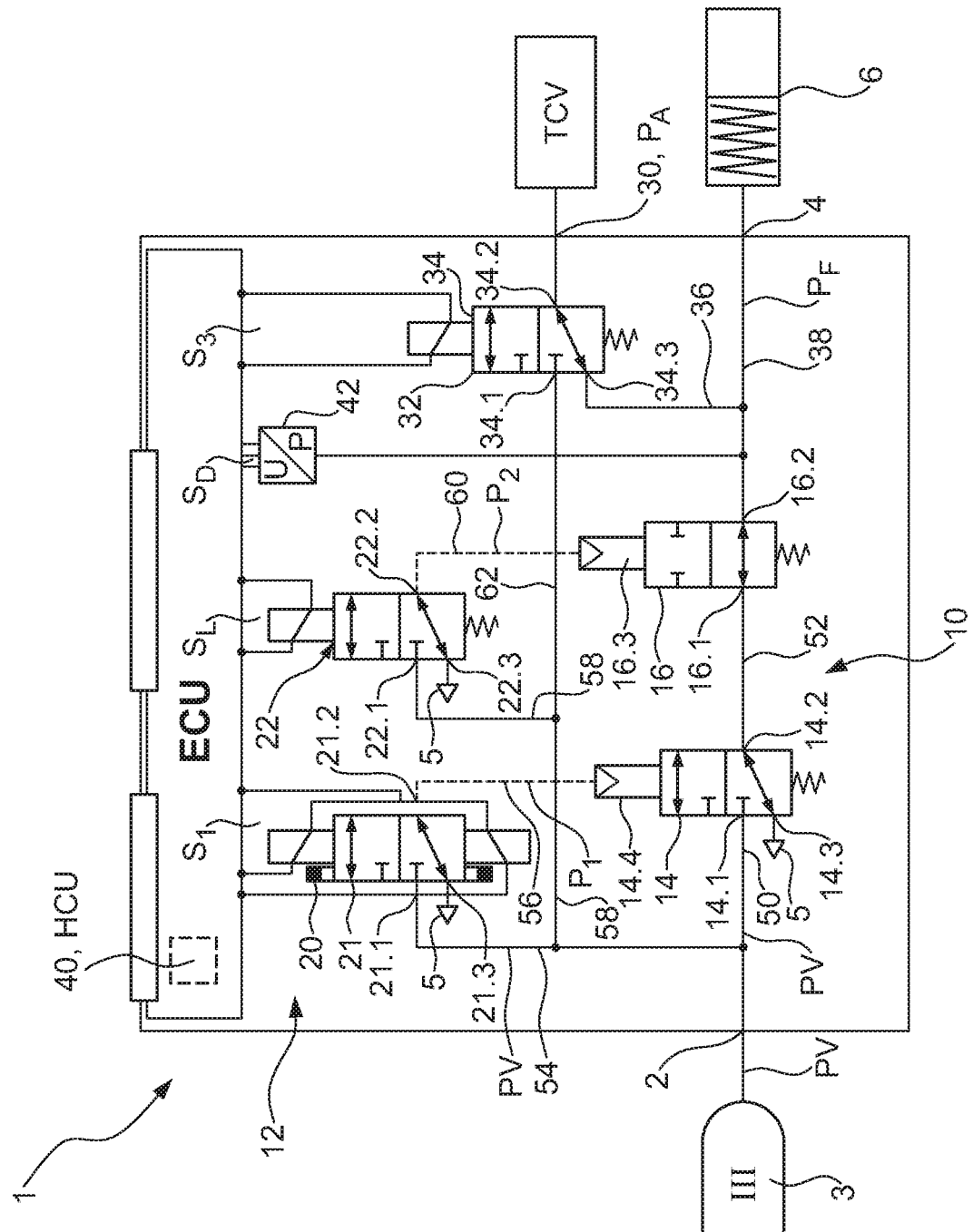
FIG. 1 shows a block diagram of an electropneumatic parking brake module according to a first exemplary embodiment.

For the sake of simplicity, the same reference numbers are used below for identical or similar parts or parts with an identical or similar function. An electropneumatic parking brake module 1 (FIG. 1) has, according to the present disclosure, a supply connection 2 to which a compressed air supply 3 is connected. Compressed air supply 3 is part of a brake system of a utility vehicle which is not represented further here. In particular, compressed air supply 3 is part of a parking brake circuit.

Electropneumatic parking brake module 1 furthermore has a spring-type actuator connection 4 to which a spring brake cylinder 6 is connected according to this exemplary embodiment. It should be understood that it is also possible to connect two or more, in particular four or more spring brake cylinders to spring-type actuator connection 4.

A supply pressure pV is provided at electropneumatic parking brake module 1 via supply connection 2 and a spring brake pressure pF is provided to spring-type actuator connection 4 via spring-type actuator connection 4. Spring-type actuators 6 are formed so that they are actuated as a result of a spring force so that a positive spring brake pressure pF is required to release spring brake cylinders 6. In the case of omission of spring brake pressure pF or undershooting of a threshold value, the spring brake cylinders are partially or fully actuated.

In order, proceeding from supply connection 2, to output spring brake pressure pF at spring-type actuator connection 4, electropneumatic parking brake module 1 has an inlet-outlet valve unit 10 and an electropneumatic pilot control unit 12. Inlet-outlet valve unit 10 can be switched so that spring brake pressure pF can be directly fed through from supply connection 2 to spring-type actuator connection 4. This is described in even greater detail below. For this purpose, in one switching position of inlet-outlet valve unit 10, spring-type actuator connection 4 is connected directly to supply connection 2. In a second switching position of inlet-outlet valve unit 10, spring-type actuator connection 4 is however connected to a vent 5 in order to enable an actuation of spring brake cylinders 6.

Inlet-outlet valve unit 10 is pneumatically controlled and can be switched on the basis of a first control pressure p1. Insofar as first control pressure p1 lies below a first predetermined threshold value, for example, 0.25 MPa, the inlet-outlet valve unit switches into the second switching position in which spring-type actuator connection 4 can be vented and thus spring brake cylinders 6 are actuated.

In detail, inlet-outlet valve unit 10 initially has for this purpose a first 3/2-way valve 14 which is pneumatically controllable and has an input connection 14.1, a working connection 14.2, a ventilating connection 14.3 and a first control input 14.4. Inlet connection 14.1 of first 3/2-way valve 14 is connected via a first pneumatic line 50 to supply connection 2. Ventilating connection 14.3 of first 3/2-way valve 14 is connected to a vent 5 which can be a central vent 5 of electropneumatic parking brake module 1. Working connection 14.2 of first 3/2-way valve 14 is connected to a pneumatic line 52. First 3/2-way valve 14 has a first switching position, not occupied in FIG. 1, in which inlet connection 14.1 of first 3/2-way valve 14 is connected to working connection 14.2 of first 3/2-way valve 14. First 3/2-way valve 14 furthermore has a second switching position which is occupied in FIG. 1 and in which ventilating connection 14.3 of the first 3/2-way valve is connected to working connection 14.2 of first 3/2-way valve 14. In this second switching position, working connection 14.2 of first 3/2-way valve 14 and thus also pneumatic line 52 can be ventilated. First 3/2-way valve 14 is pretensioned in a spring-loaded manner into the second switching position. By corresponding application of first control pressure p1 at first control input 14.4 of first 3/2-way valve 14, first 3/2-way valve 14 can be transferred into the first switching position, not shown, in order to output supply pressure pV in pneumatic line 52.

In the exemplary embodiment shown in FIG. 1, second pneumatic line 52 is connected to a first check valve connection 16.1 of a 2/2-way check valve 16. Second check valve connection 16.2 of 2/2-way check valve 16 is connected to a spring brake pressure line 38 which itself is connected to spring-type actuator connection 4. That means that working connection 14.2 of first 3/2-way valve 14 is ultimately connected to spring-type actuator connection 4 if 2/2-way check valve 16 is in the opening switching position shown in FIG. 1. 2/2-way check valve 16 is part of inlet-outlet valve unit 10 and is also pneumatically controlled like first 3/2-way valve 14. 2/2-way check valve 16 is pretensioned in a spring-loaded manner into the second open switching position shown in FIG. 1. 2/2-way check valve 16 has a second control connection 16.3 at which a second control pressure p2 can be output.

It should be understood that there can also be embodiments according to the present disclosure which do not use a 2/2-way check valve 16, rather in the case of which spring brake pressure line 38 is connected directly to working connection 14.2 of the first 3/2-way valve.

2/2-way check valve 16 primarily serves the purpose of graduated aeration and ventilation of spring-type actuator connection 4. If first 3/2-way valve 14 is in the second switching position shown in FIG. 1, first check valve connection 16.1 is connected to vent 5. If 2/2-way check valve 16 is now moved into the first switching position not shown in FIG. 1, spring-type actuator connection 4 is not ventilated despite the switching of first 3/2-way valve 14 into the second switching position shown in FIG. 1. It is only upon switching of 2/2-way check valve 16 into the second switching position shown in FIG. 1 that spring-type actuator connection 4 would be vented. For example, for the purpose of auxiliary braking, 2/2-way check valve 16 can now be moved in a pulsed manner from the first switching position, not shown in FIG. 1, into the second switching position shown in FIG. 1 in order to vent spring-type actuator connection 4 in a graduated manner and partially and temporarily actuate spring brake cylinders 6.

Electropneumatic pilot control unit 12 serves to output at least first control pressure p1 and provide it at inlet/outlet valve unit 10 in order to cause inlet/outlet valve unit 10 to switch and output a corresponding spring brake pressure pF at spring-type actuator connection 4. To be more precise, by outputting first control pressure p1, pilot control unit 12 causes first 3/2-way valve 14 to change from the second switching position into the first switching position if output first control pressure p1 assumes or exceeds the first defined threshold value. Insofar as electropneumatic parking brake module 1 has a 2/2-way check valve 16, and insofar as this 2/2-way check valve 16 is formed to be pneumatically controlled, electropneumatic pilot control unit 12 is preferably also formed to output second control pressure p2 and output it at inlet-outlet valve unit 10, preferably at second control input 16.3 of 2/2-way check valve 16.

For this purpose, electropneumatic pilot control unit 12 firstly has a second 3/2-way valve 20 which is connected to supply connection 2 and a vent 5 for outputting first control pressure p1. To be more precise, second 3/2-way valve 20 is formed in this embodiment as bistable valve 21 and has a first bistable valve connection 21.1, a second bistable valve connection 21.2 and a third bistable valve connection 21.3. Bistable valve 21 has a first switching position, not shown in FIG. 1, in which first bistable valve connection 21.1 is connected to second bistable valve connection 21.2, and a second switching position, shown in FIG. 1, in which second bistable valve connection 21.2 is connected to third bistable valve connection 21.3. First bistable valve connection 21.1 is connected to supply connection 2. To be more precise, first bistable valve connection 21.1 is connected via a third pneumatic line 54 to supply connection 2, wherein third pneumatic line 54 branches off from first pneumatic line 50. In this respect, supply pressure pV is present at first bistable valve connection 21.1. Third bistable valve connection 21.3 is connected to a vent 5 which can be the central vent of electropneumatic parking brake module 1. Second bistable valve connection 21.2 is in contrast connected to a first pneumatic control line 56 into which first pneumatic control pressure p1 is output. On the other hand, first pneumatic control line 56 is connected to first control input 14.4 of first 3/2-way valve 14.

Bistable valve 21 is formed so that it is stable both in the first switching position, not shown in FIG. 1, and in the second switching position shown in FIG. 1. This is achieved by a permanent magnet which correspondingly holds the valve armature in the switching positions. This means that bistable valve 21 can remain currentless both in the first and in the second switching position.

In order to output second control pressure p2, electropneumatic pilot control unit 12 has according to this exemplary embodiment a third 3/2-way valve 22. Third 3/2-way valve 22 is connected to supply connection 2, a vent 5 and second control input 16.3 of 2/2-way check valve 16.

In detail, third 3/2-way valve 22 has an inlet connection 22.1, a working connection 22.2 as well as a ventilating connection 22.3. Inlet connection 22.1 of third 3/2-way valve 22 is connected to a fourth pneumatic line 58. Third pneumatic line 58 branches off from second pneumatic line 54. This means that supply pressure pV is also present at inlet connection 22.1 of third 3/2-way valve 22.

Working connection 22.2 of third 3/2-way valve 22 is connected to a second pneumatic control line 60 which itself leads to second control input 16.3 of 2/2-way check valve 16. Second control pressure p2 is consequently output at working connection 22.2 of third 3/2-way valve 22. Ventilating connection 22.3 of third 3/2-way valve 22 is connected to a vent 5, in particular the central joint vent of electropneumatic parking brake module 1.

Electropneumatic parking brake module 1 has an electric control unit ECU. Electric control unit ECU is provided to provide an actuating signal S1 at the second 3/2-way valve, in particular bistable valve 21, in order to switch it between the first and second switching positions. Electric control unit ECU is furthermore formed to provide a second actuating signal S2 at third 3/2-way valve 22 in order to move third 3/2-way valve 22 from the second switching position shown in FIG. 1 into the first switching position, not shown in FIG. 1. In the first switching position, not shown in FIG. 1, inlet connection 22.1 of third 3/2-way valve 22 is connected to working connection 22.2 of third 3/2-way valve 22 so that second control pressure p2 is output and subsequently, upon exceeding of the second threshold value, switches 2/2-way check valve 16 and thus shuts off second check valve connection 16.2 from first check valve connection 16.1.

Electric control unit ECU furthermore has an electronic connection 40 to which at least one vehicle bus or an HCU switch can be directly connected. If, for example, a vehicle which has electromagnetic parking brake module 1 is started, a signal is preferably provided at electronic connection 40 that spring brake cylinders 6 should be released. Electric control unit ECU generates, on the basis of the received signal, signal S1 and switches second 3/2-way valve 20 into the first switching position, not shown, in order to output first control pressure p1 so that first 3/2-way valve 14 is also switched into the second switching position, not shown, in order to output spring brake pressure pF so that spring-type actuator connection 4 is aerated. Spring brake cylinders 6 connected to spring-type actuator connection 4 are consequently aerated and released. The vehicle can begin to move.

Second signal S2 is triggered on the basis of auxiliary braking requirement signals received via electronic connection 40 and serves to switch third 3/2-way valve 22 and as a result 2/2-way check valve 16 in order to ventilate spring brake cylinders 6 which are connected to spring-type actuator connection 4 in a graduated manner.

The first embodiment shown in FIG. 1 of electropneumatic parking brake module 1 also enables a trailer control position function.

In the case of towing vehicle-trailer combinations, it is preferred that the service brakes of the trailer are braked in coordination with spring brake cylinders 6 of the towing vehicle. In this case, a differentiation is made in principle between what is known as European trailer control and what is known as Scandinavian trailer control. While in the case of European trailer control, the service brakes of the trailer should be permanently applied in the parked state of the vehicle, in the case of Scandinavian trailer control, it is required that, in the parked state of the towing vehicle-trailer combination, the service brakes of the trailer are released in order to prevent freezing. It is nevertheless also required in the case of Scandinavian trailer control that the service brakes of the trailer are also applied for other cases in which spring brake cylinders 6 of the towing vehicle are activated, i.e. actuated.

For this purpose, electropneumatic parking brake module 1 according to this embodiment has a trailer control valve connection 30 as well as a trailer valve 32. A trailer control pressure pA which corresponds to spring brake pressure pF or is an equivalent pressure to this is output at trailer control valve connection 30. A trailer control valve TCV which inverts provided trailer control pressure pA and then outputs it inversely at service brakes of a trailer (not shown) can be connected to trailer control valve connection 30.

Trailer valve 32 serves to implement the trailer control position function. For this purpose, trailer valve 32, in this embodiment (FIG. 1), is formed as fourth 3/2-way valve 34 and has a first trailer valve connection 34.1, a second trailer valve connection 34.2 and a third trailer valve connection 34.3. In a first switching position, not shown in FIG. 1, first trailer valve connection 34.1 is connected to second trailer valve connection 34.2. In a second switching position shown in FIG. 1, second trailer valve connection 34.2 is connected to third trailer valve connection 34.3. The first trailer valve connection is connected to a fourth pneumatic line 62 which branches off from third pneumatic line 58. In this regard, supply pressure pV is present at first trailer valve connection 34.1. Second trailer valve connection 34.2 is connected to trailer valve connection 30. Third trailer valve connection 34.3 is connected via a branch line 36 to spring brake pressure line 38 into which spring brake pressure pF is output. This means that spring brake pressure pF is present at third trailer valve connection 34.3.

Either supply pressure pV or spring brake pressure pF can now be output via trailer valve 32 at trailer control valve connection 30. In the event that spring brake pressure pF is output as trailer control pressure PA, the service brakes of the trailer vehicle are controlled in coordination with spring brake cylinders 6. This means that, if spring brake cylinders 6 are actuated, the service brakes of the trailer are also actuated. In order to prevent this, trailer valve 32 can be moved into the first switching position via a third signal S3 by electric control unit ECU so that supply pressure pV is output at trailer control valve connection 30 as trailer control pressure PA. In this case, the service brakes of the trailer vehicle remain released.

The exemplary embodiment shown in FIG. 1 uses a trailer valve 32 which is currentless in the second switching position shown in FIG. 1 and thus outputs spring brake pressure pF as trailer control pressure pA in a currentless state. The exemplary embodiment shown in FIG. 1 thus implements European trailer control in which, in a parked state of the vehicle (currentless state), the trailer is braked in coordination with spring brake cylinders 6 of the towing vehicle.

Figure 3:
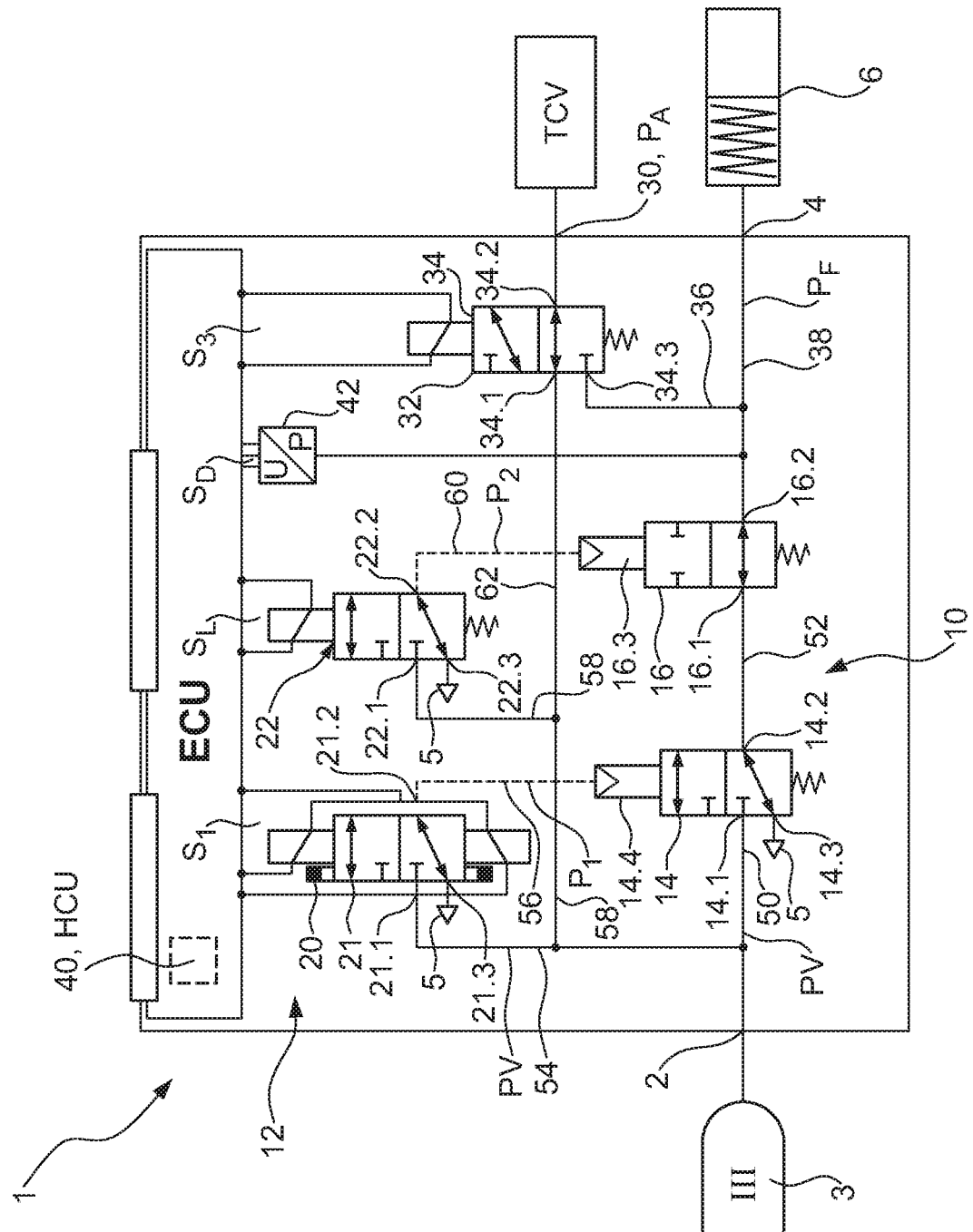
FIG. 3 shows a block diagram of an electropneumatic parking brake module according to a third exemplary embodiment.

A variant of this, namely Scandinavian trailer control, is shown in FIG. 3. As is apparent from FIG. 3, the only difference in the third exemplary embodiment of electropneumatic parking brake module 1 lies in the switching positions of trailer valve 32 being reversed. This means that trailer valve 32 according to the third exemplary embodiment (FIG. 3) is currentless in the switching position referred to as the first switching position in the first exemplary embodiment (FIG. 1) and thus connects first trailer valve connection 34.1 to second trailer valve connection 34.2 in a currentless state so that in a currentless state supply pressure pV is output as trailer control pressure pA and thus the service brakes of the trailer are released in the currentless state (parked state).

In the context of the present disclosure, both European trailer control and Scandinavian trailer control can therefore be implemented in a particularly simple manner with electropneumatic parking brake module 1.

Both in the first and in the third exemplary embodiment (FIGS. 1 and 3), compressed air supply 3 is connected directly to supply connection 2. These two embodiments (FIG. 1 and FIG. 3) therefore also enable a ventilation of spring-type actuator connection 4 by pumping down compressed air supply 3. In the event that, for example, bistable valve 21 functions incorrectly and sticks permanently in the first switching position, not shown in FIGS. 1 and 3, in which first control pressure p1 is output, spring-type actuator connection 4 can be ventilated as a result of the fact that compressed air supply 3 is overall pumped down and is thus adjusted to an ambient pressure level. Secure braking of the vehicle can thus be achieved even in the event of a malfunction of bistable valve 21 or also in the event of a malfunction of electric control unit ECU, or of first 3/2-way valve 14.

Figure 2:
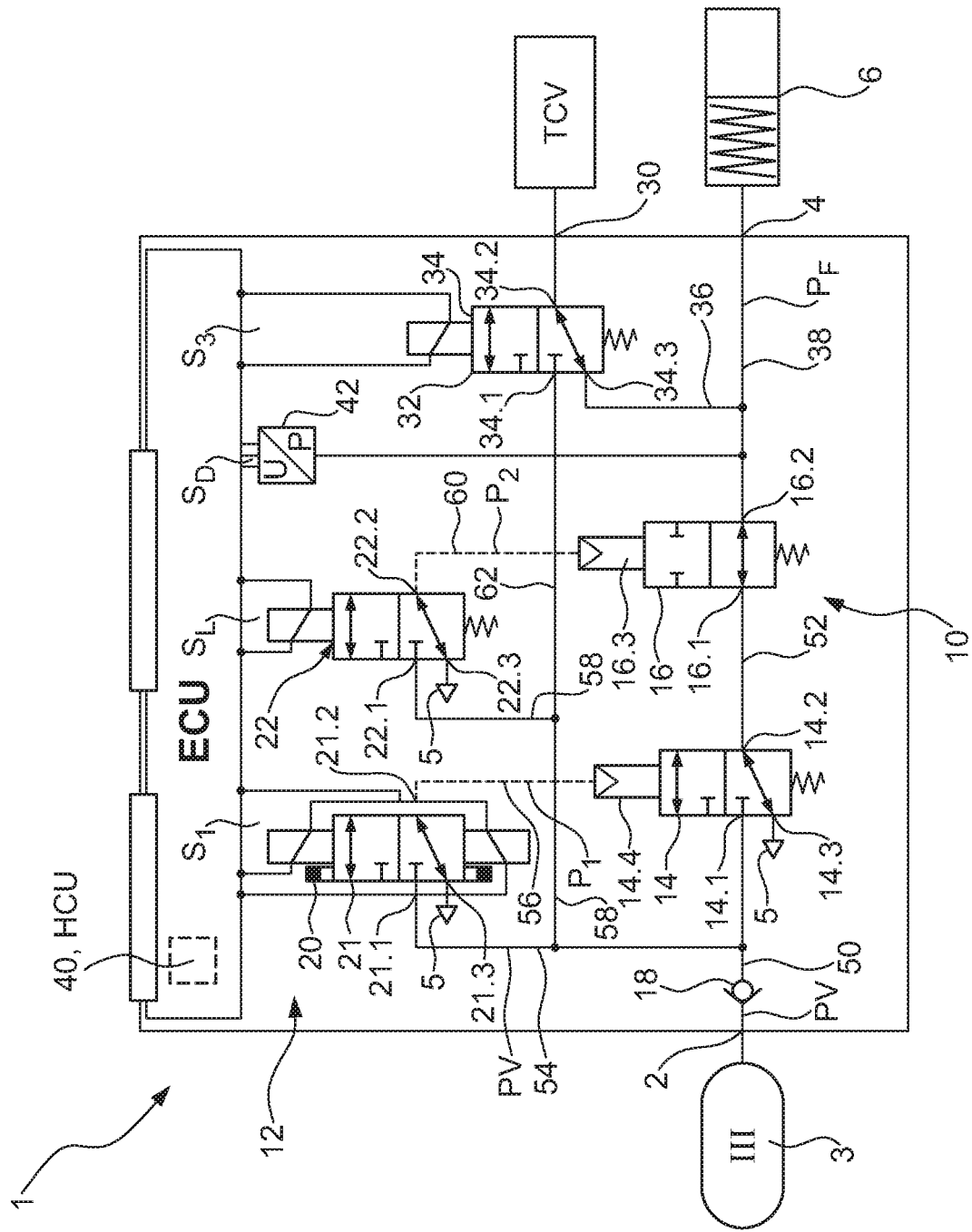
FIG. 2 shows a block diagram of an electropneumatic parking brake module according to a second exemplary embodiment.

In the second exemplary embodiment (FIG. 2) of electropneumatic parking brake module 1, in contrast, an additional non-return valve 18 is inserted into first pneumatic line 50, and indeed directly downstream of supply connection 2, i.e. between supply connection 2 and the branch point of third pneumatic line 54. A return flow of compressed air from spring brake cylinders 6 into compressed air supply 3 is prevented via said non-return valve 18. As a result of this, it is possible that a released state of spring brake cylinders 6 can be permanently maintained even in the case of a leak of compressed air supply 3, and the vehicle does not brake via spring brake cylinders 6 in an unintentional manner as a result of a leak or crack in a pneumatic line.

The fourth exemplary embodiment (FIG. 4) of electropneumatic parking brake module 1 differs from the first three exemplary embodiments (FIGS. 1-3) in that electropneumatic parking brake module 1 does not have a trailer control valve connection 30. No trailer control valve 32 is also accordingly provided. Fourth pneumatic line 62 and branch line 36 are thus also omitted. The remaining elements and components of the fourth exemplary embodiment are identical to the first three exemplary embodiments.

Figure 4:
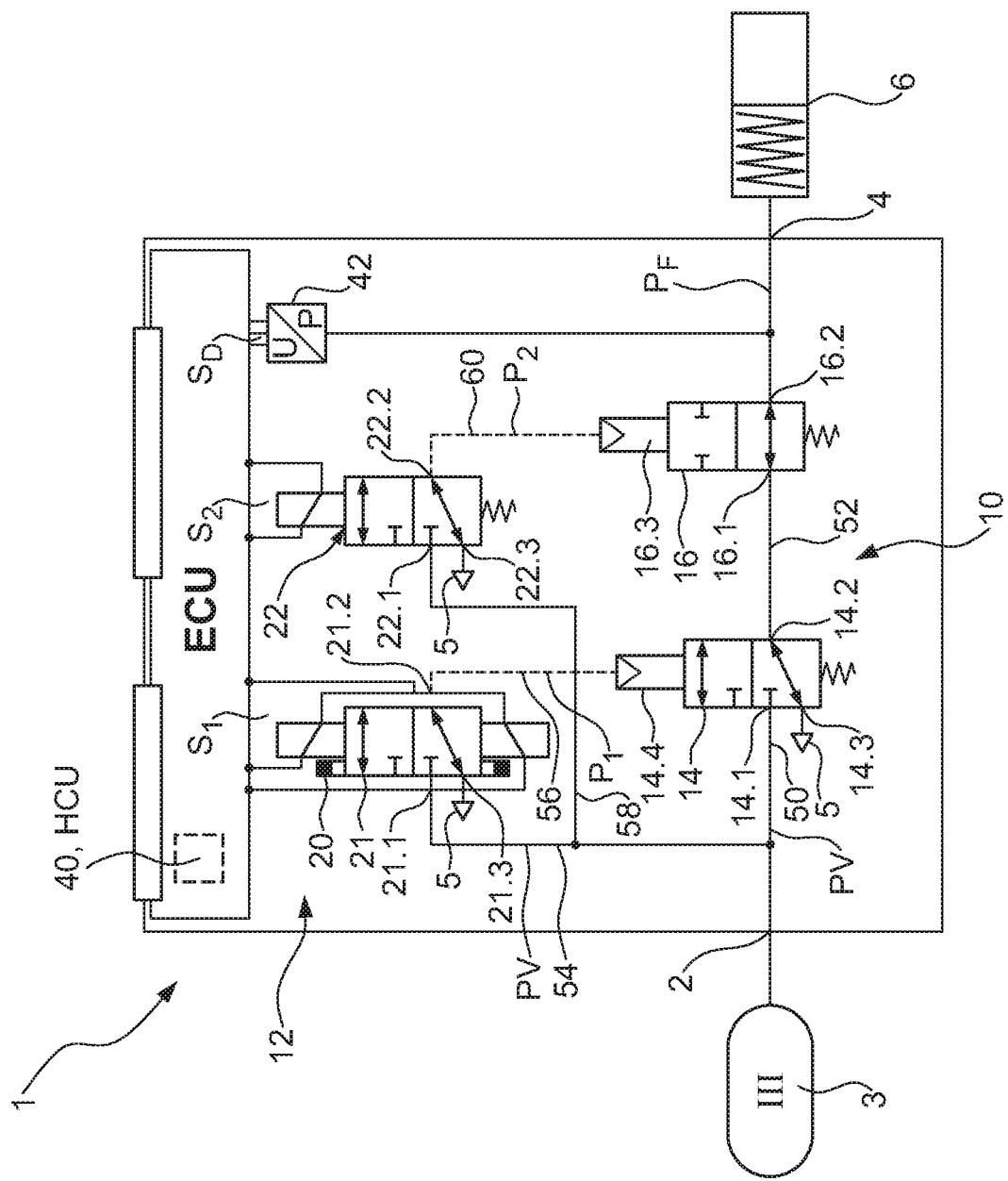
FIG. 4 shows a block diagram of an electropneumatic parking brake module according to a fourth exemplary embodiment.
Figure 5:
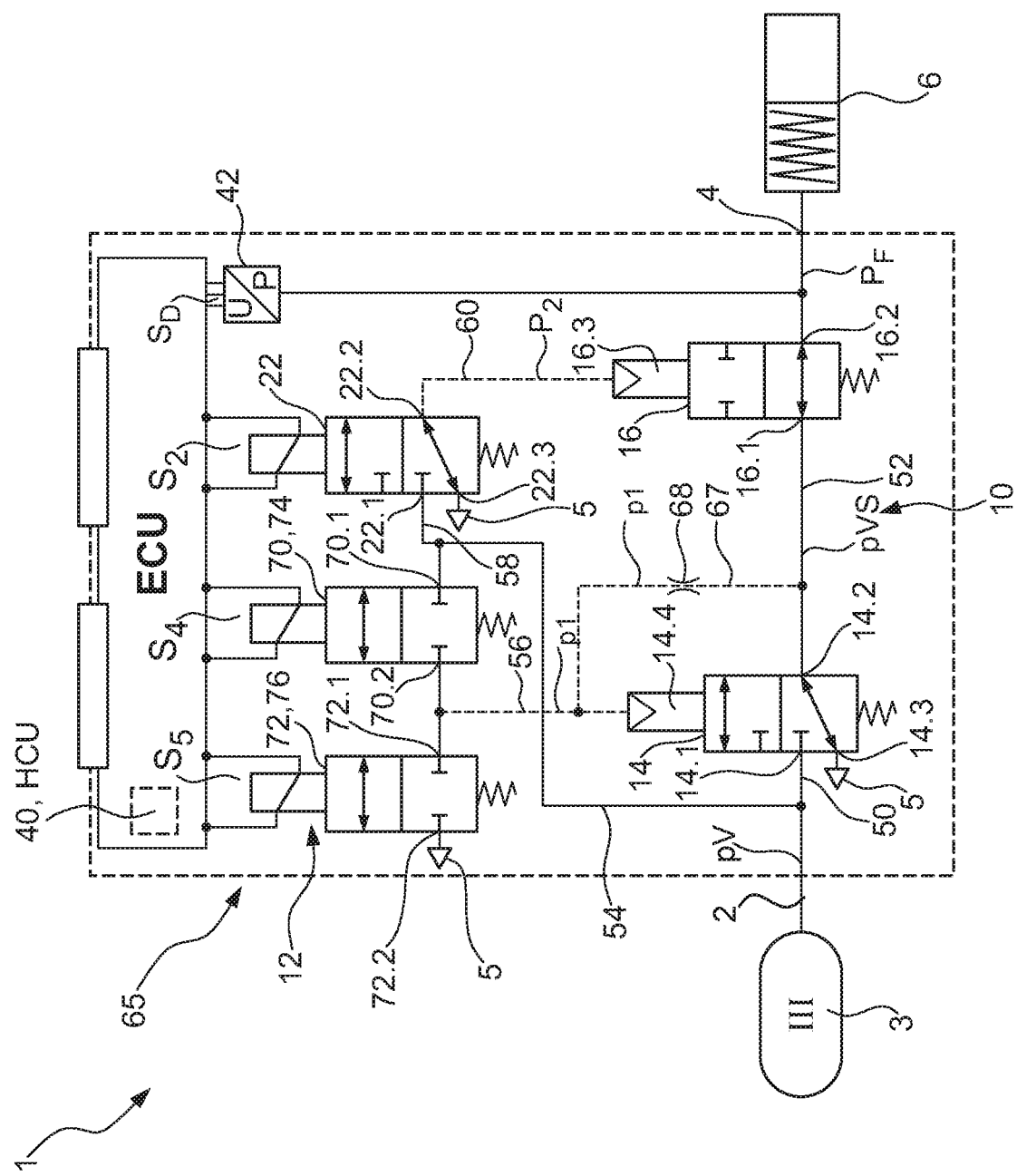
FIG. 5 shows a block diagram of an electropneumatic parking brake module according to a fifth exemplary embodiment.
Figure 6:
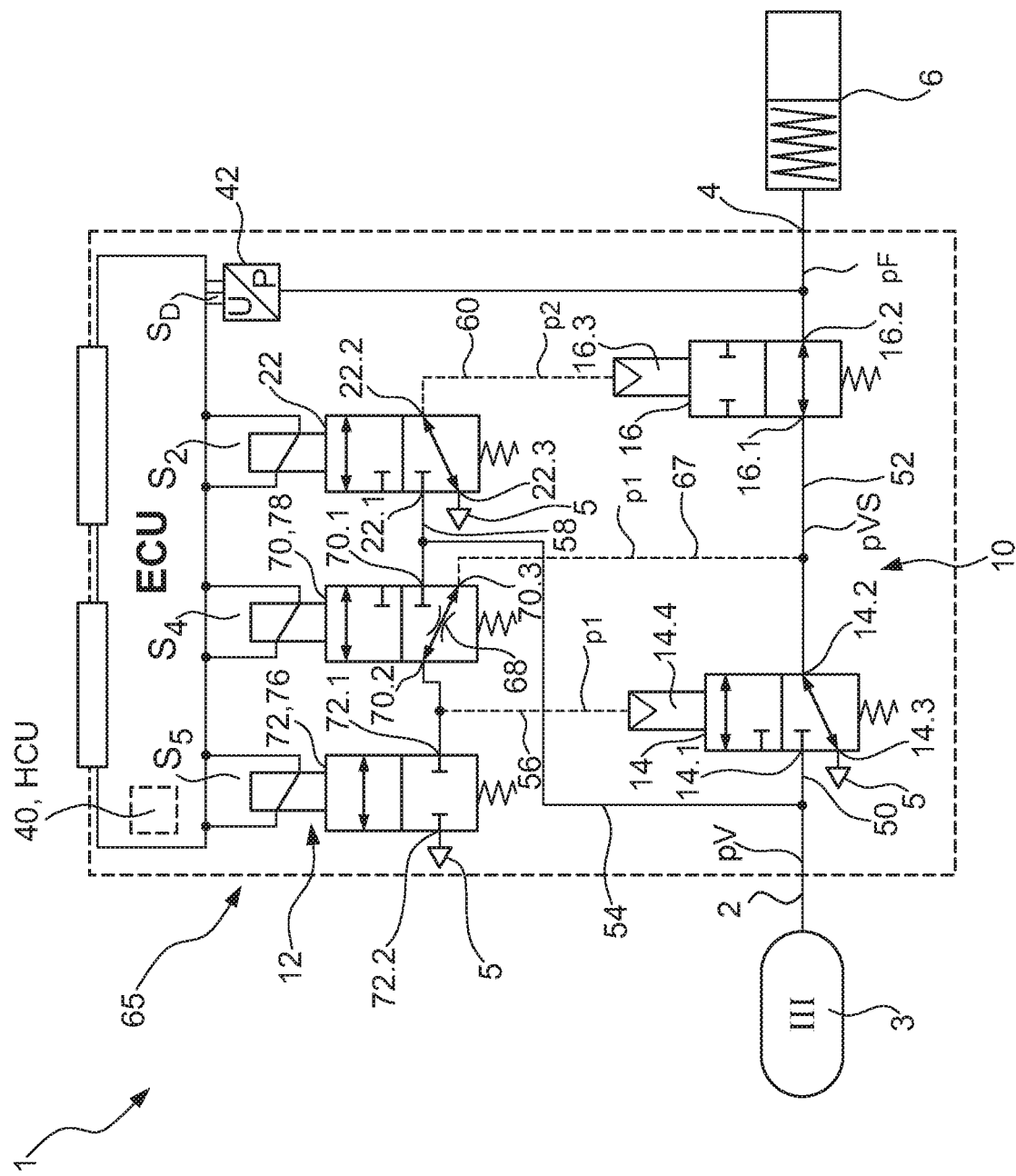
FIG. 6 shows a block diagram of an electropneumatic parking brake module according to a sixth exemplary embodiment.
Figure 7:
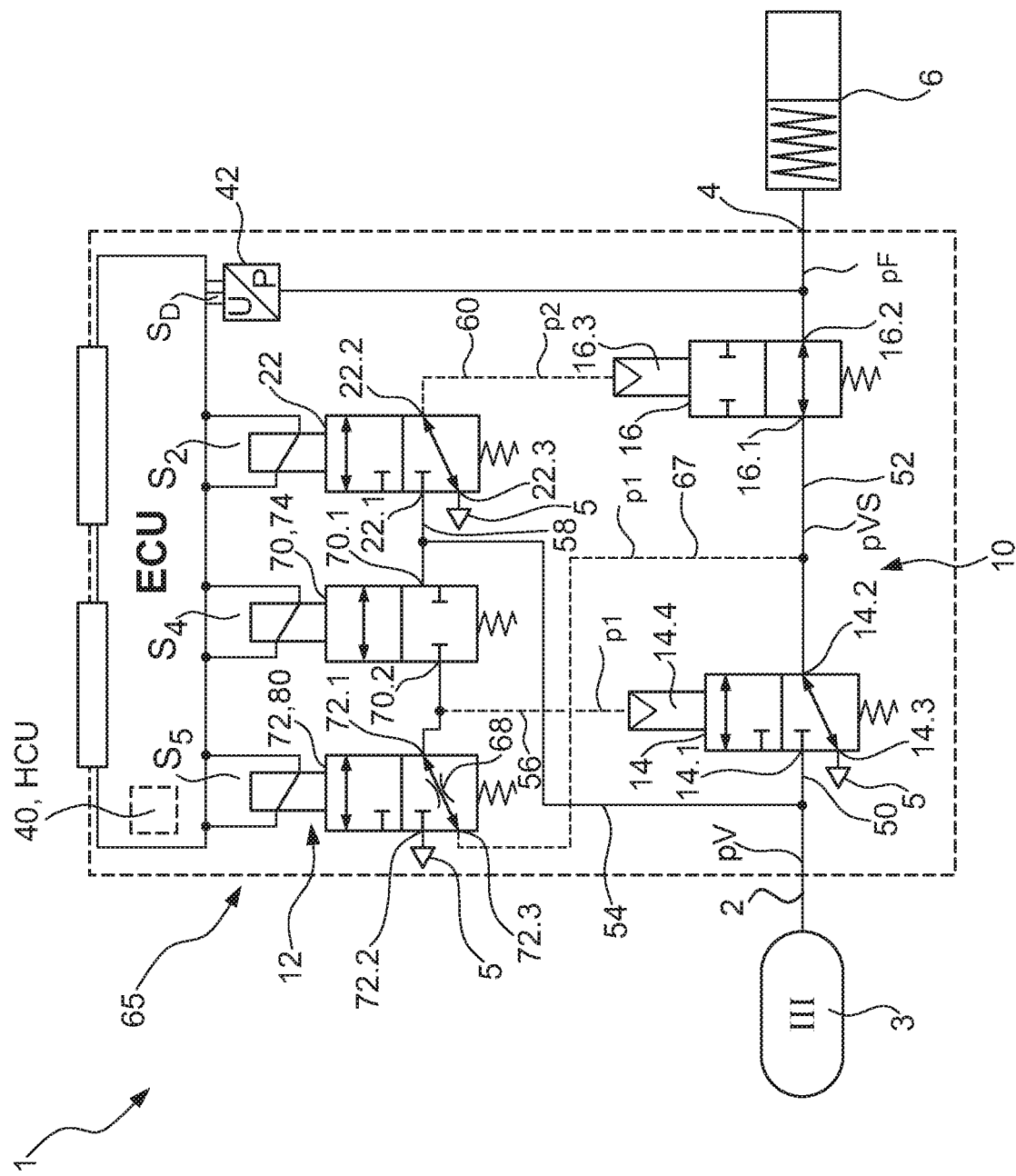
FIG. 7 shows a block diagram of an electropneumatic parking brake module according to a seventh exemplary embodiment.

Exemplary embodiments 5, 6 and 7 according to FIGS. 5, 6 and 7 show in each case an electropneumatic parking brake module 1, as is fundamentally known from the fourth exemplary embodiment (FIG. 4). Bistable valve 21 is nevertheless replaced by a monostable inlet-outlet valve combination 65.

A particularly simple circuit layout is first described with reference to FIG. 5 in a fifth exemplary embodiment. Monostable inlet-outlet valve combination 65 has an inlet valve 70 and an outlet valve 72. Inlet valve 70 is in this exemplary embodiment formed as 2/2-way inlet valve 74 and has a first inlet valve connection 70.1 and a second inlet valve connection 70.2. Inlet valve 70 is formed as a monostable valve and is pretensioned into the first closed switching position shown in FIG. 5. By providing a fourth switching signal S4, inlet valve 70 can be switched from the first switching position shown in FIG. 5 into the second switching position, not shown in FIG. 5. In the second switching position, not shown in FIG. 5, first inlet valve connection 70.1 is connected to second inlet valve connection 70.2.

Second inlet valve connection 70.2 is connected to first pneumatic control line 56 which, as has already been described with reference to the first four exemplary embodiments, is connected to first control connection 14.4 of first 3/2-way valve. By switching inlet valve 70, first control pressure p1 can consequently be output. As soon as this exceeds the first threshold value, first 3/2-way valve 14 switches into the second switching position, not shown in FIG. 5, and working pressure pVS is output at working connection 14.2, which working pressure pVS can then be provided as spring brake pressure pF if 2/2-way check valve 16 is in the open switching position shown in FIG. 5.

In order to achieve a pneumatic self-retention of first 3/2-way valve 14, in the first four exemplary embodiments (FIGS. 1 to 4), bistable valve 21 was used which is stable both in the first and in the second switching position. Monostable inlet-outlet valve combination 65 is, however, not stable in the open switching position, but rather in the closed one. For this reason, electropneumatic parking brake module 1 according to the fifth exemplary embodiment (FIG. 5) has a return line 67 which returns working pressure pVS output by first 3/2-way valve 14 to first control input 14.4 and provides it there as first control pressure p1. In this manner, first control pressure p1 is maintained even if inlet valve 70, once it has firstly been switched into the open switching position, is switched back into the closed switching position. A pneumatic self-retention is achieved.

Outlet valve 72 is provided to ventilate first control input 14.4 in order to allow first 3/2-way valve 14 to fall back into the first switching position shown in FIG. 5. Said outlet valve 72 is, according to the fifth exemplary embodiment (FIG. 5), in turn formed as 2/2-way outlet valve 76. It has a first outlet valve connection 72.1 and a second outlet valve connection 72.2. First outlet valve connection 72.1 is connected to first pneumatic control line 56, and second outlet valve connection 72.2 is connected to a vent 5. 2/2-way outlet valve 76 is currentless in the closed first switching position shown in FIG. 5. 2/2-way outlet valve 76 can be moved into the second open switching position, not shown in FIG. 5, in which first outlet valve connection 72.1 is connected to second outlet valve connection 72.2, by a corresponding fifth switching signal S5. In this manner, first pneumatic control line 56 and thus first control connection 14.4 can be ventilated so that first 3/2-way valve 14 can fall back into the first switching position shown in FIG. 5. As a result of this, spring-type actuator connection 4 is ventilated even if check valve 16 is in the open switching position shown in FIG. 5.

In order to not immediately release the pneumatic self-retention in the case of small fluctuations in pressure at spring-type actuator connection 4 and enable a change in the switching states, a throttle 68 is arranged in return line 67 according to this exemplary embodiment (FIG. 5). Throttle 68 can also be arranged at other positions.

As is apparent from FIG. 5, return line 67 is connected directly to first control input 14.4 without interconnection of a valve. The returned pressure can therefore not be shut out, rather is provided immediately when first 3/2-way valve 14 has switched. In this regard, throttle 68 is also useful to avoid excess output.

Exemplary embodiments 6 and 7 now show variants in the case of which return line 67 is not connected directly to first control input 14.4, rather a valve is interconnected.

FIG. 6 initially shows in a sixth exemplary embodiment that inlet valve 70 is formed as 3/2-way inlet valve 78. It has in this regard a third inlet valve connection 70.3 which is then connected to return line 67. First inlet valve connection 70.1 is, as also in the case of the fifth exemplary embodiment (FIG. 5), connected to supply connection 2, in particular via third pneumatic line 54. Second inlet 70.2 is, as already known from the fifth exemplary embodiment (FIG. 5), connected to first pneumatic control line 56. By switching 3/2-way inlet valve 78 into the second switching position, not shown in FIG. 6, second inlet valve connection 70.2 is therefore connected to supply connection 2 so that first control pressure p1 is output. As a result of this, first 3/2-way valve 14 switches into the second switching position, not shown in FIG. 6, and working pressure pVS is output. This pressure is returned via return line 67 and is then present at third inlet valve connection 70.3. If inlet valve 70 is now switched to be currentless, it falls back into the first switching position shown in FIG. 6, and third inlet valve connection 70.3 is connected to second inlet valve connection 70.2. The returned pressure is fed through and provided as first control pressure p1 at first control input 14.4. As a result of this, a pneumatic self-retention of first 3/2-way valve 14 is then achieved. In this exemplary embodiment (FIG. 6), throttle 68 is formed in 3/2-way inlet valve 78.

In a similar manner, in the seventh exemplary embodiment (FIG. 7), outlet valve 72 is formed as 3/2-way outlet valve 80. Inlet valve 70 is, as in the fifth exemplary embodiment (FIG. 5), formed as 2/2-way inlet valve 74.

3/2-way outlet valve 80 has a third outlet valve connection 72.3 which is then connected in this exemplary embodiment (FIG. 7) to return line 67. This means that the key difference between the sixth exemplary embodiment (FIG. 6) and the seventh exemplary embodiment (FIG. 7) lies in the fact that return line 67 is not connected to inlet valve 70, but rather to outlet valve 72. In this variant, in the event of switching of inlet valve 70 and outputting of first control pressure p1, first 3/2-way valve 14 is also switched and working pressure pVS is provided as first control pressure via return line 67, outlet valve 72 and first pneumatic control line 56. Provision is carried out immediately and not only upon inlet valve 70 being switched into a currentless state, as is the case in the sixth exemplary embodiment (FIG. 6). 3/2-way outlet valve 80 is currentless in the second switching position shown in FIG. 7, in the case of which third outlet valve connection 72.3 is connected to first outlet valve connection 72.1 so that return line 67 is connected to first pneumatic control line 56. A pneumatic self-retention of first 3/2-way valve 14 can also be achieved in this manner.

While the above description constitutes the preferred embodiments of the present invention, it will be appreciated that the invention is susceptible to modification, variation and change without departing from the proper scope and fair meaning of the accompanying claims.

LIST OF REFERENCE NUMBERS (PART OF THE DESCRIPTION)

1 Electropneumatic parking brake module
2 Supply connection
3 Compressed air supply
4 Spring-type actuator connection
5 Vent
6 Spring brake cylinder
10 Inlet-outlet valve unit
12 Electropneumatic pilot control unit
14 First 3/2-way valve
14.1 Inlet connection of the first 3/2-way valve
14.2 Working connection of the first 3/2-way valve
14.3 Ventilating connection of the first 3/2-way valve
14.4 First control input of the first 3/2-way valve
16 2/2-way check valve
16.1 First check valve connection
16.2 Second check valve connection
16.3 Second control input
18 Non-return valve
20 Second 3/2-way valve
21 Bistable valve
21.1 First bistable valve connection
21.2 Second bistable valve connection
21.3 Third bistable valve connection
22 Third 3/2-way valve
22.1 Inlet connection of the third 3/2-way valve
22.2 Working connection of the third 3/2-way valve
22.3 Ventilating connection of the third 3/2-way valve
30 Trailer control valve connection
32 Trailer valve
34 Fourth 3/2-way valve
34.1 First trailer valve connection
34.2 Second trailer valve connection
34.3 Third trailer valve connection
36 Branch line
38 Spring brake pressure line
40 Electronic connection
50 First pneumatic line
52 Second pneumatic line
54 Third pneumatic line
56 First pneumatic control line
58 Third pneumatic line
60 Second pneumatic control line
62 Fourth pneumatic line
65 Monostable inlet-outlet valve combination
67 Return line
68 Throttle
70 Inlet valve
70.1 First inlet valve connection
70.2 Second inlet valve connection
70.3 Third inlet valve connection
72 Outlet valve
72.1 First outlet valve connection
72.2 Second outlet valve connection
72.3 Third outlet valve connection
74 2/2-way inlet valve
76 2/2-way outlet valve
78 3/2-way inlet valve
80 3/2-way outlet valve
ECU Electronic control unit
pA Trailer control pressure
pV Supply pressure
pVS Pressure output by the first 3/2-way valve
pF Spring brake pressure
p1 First control pressure
p2 Second control pressure
S1 First switching signal
S2 Second switching signal
S3 Third switching signal
S4 Fourth switching signal
S5 Fifth switching signal SD Pressure signal
TCV Trailer control valve

The invention claimed is:

1. An electropneumatic parking brake module (1), comprising:
   a supply connection (2) for connecting a compressed air supply (3),
   a spring actuator connection (4) for connecting a spring brake cylinder (6),
   an inlet-outlet valve unit (10) configured to assume at least a first switching position and a second switching position, and
   an electropneumatic pilot control unit (12) for outputting at least a first control pressure (p1) at the inlet-outlet valve unit (10),
   wherein, in the first switching position of the inlet-outlet valve unit (10), the spring actuator connection (4) is connected to the supply connection (2) for outputting a spring brake pressure (pF), and, in the second switching position of the inlet-outlet valve unit (10), the spring actuator connection (4) is connected to a ventilating connection (14.3) of the inlet-outlet valve unit (10),
   wherein the inlet-outlet valve unit (10) has at least a first 3/2-way valve (14) with exactly two switching positions, and
   wherein the inlet-outlet valve unit (10) is in the second switching position when the first control pressure (p1) is below a first threshold value.

2. The electropneumatic parking brake module (1) as claimed in claim 1, wherein, in the first switching position, the inlet-outlet valve unit (10) is configured to feed the spring brake pressure (pF) directly from the supply connection (2) to the spring actuator connection (4).

3. The electropneumatic parking brake module (1) as claimed in claim 2, wherein, during direct feeding of the spring brake pressure (pF) from the supply connection (2) to the spring actuator connection (4), a volume connection between the supply connection (2) and the spring actuator connection (4) is produced without interconnecting a relay valve.

4. The electropneumatic parking brake module (1) as claimed in claim 1, wherein at least the first 3/2-way valve (14) is controlled pneumatically.

5. The electropneumatic parking brake module (1) as claimed in claim 1, wherein the first 3/2-way valve (14) has an inlet connection (14.1), a working connection (14.2) and a ventilating connection (14.3), and the first 3/2-way valve (14) is formed to reciprocally connect the working connection (14.2) to the inlet connection (14.1) and the ventilating connection (14.3).

6. The electropneumatic parking brake module (1) as claimed in claim 5, wherein the electropneumatic parking brake module is configured to output a supply pressure (pV) at the input connection (14.1).

7. The electropneumatic parking brake module (1) as claimed in claim 5, wherein a non-return valve (18) is arranged between the input connection (14.1) and the supply connection (2) to prevent a return flow from the spring actuator connection (4) to the supply connection (2).

8. The electropneumatic parking brake module (1) as claimed in claim 5, wherein the inlet-outlet valve unit (10) has a 2/2-way check valve (16) with a first check valve connection (16.1) and a second check valve connection (16.2), wherein the first check valve connection (16.1) is connected to the working connection (14.2), and the second check valve connection (16.2) is connected to the spring actuator connection (4).

9. The electropneumatic parking brake module (1) as claimed in claim 1, wherein the electropneumatic pilot control unit (12) has at least a second 3/2-way valve (20), wherein the second 3/2-way valve (20) is provided to output the first control pressure (p1).

10. The electropneumatic parking brake module (1) as claimed in claim 9, wherein the second 3/2-way valve (20) is formed as a bistable valve (21).

11. The electropneumatic parking brake module (1) as claimed in claim 10, wherein the bistable valve (21) has a first bistable valve connection (21.1), a second bistable valve connection (21.2) and a third bistable valve connection (21.3), wherein the first bistable valve connection (21.1) is connected to the supply connection (2), the second bistable valve connection (21.2) outputs the first control pressure (p1) and the third bistable valve connection (21.3) is connected to a vent.

12. The electropneumatic parking brake module (1) as claimed in claim 11, wherein the second bistable valve connection (21.2) is connected to a first control input (14.4) of the first 3/2-way valve (14).

13. The electropneumatic parking brake module (1) as claimed in claim 1, wherein the electropneumatic pilot control unit (12) has at least a third 3/2-way valve (22) for outputting a second control pressure (p2).

14. The electropneumatic parking brake module (1) as claimed in claim 13, wherein the third 3/2-way valve (22) has an inlet connection (22.1), a working connection (22.2) and a ventilating connection (22.3), and the third 3/2-way valve (22) is formed to reciprocally connect the working connection (22.2) to the inlet connection (22.1) and the ventilating connection (22.3).

15. The electropneumatic parking brake module (1) as claimed in claim 1, further comprising a trailer control valve connection (30) for providing a trailer control pressure (pA).

16. The electropneumatic parking brake module (1) as claimed in claim 15, wherein the trailer control valve connection (30) is connected to a trailer valve (32) which is configured to output at least the spring brake pressure (pF) as trailer control pressure (pA) at the trailer control valve connection (30) in a first switching position of the trailer valve (32).

17. The electropneumatic parking brake module (1) as claimed in claim 16, wherein the trailer valve (32) has a second switching position for performing a trailer control position function.

18. The electropneumatic parking brake module (1) as claimed in claim 17, wherein the trailer valve (32) is a fourth 3/2-way valve (34) and has a first trailer valve connection (34.1), a second trailer valve connection (34.2) and a third trailer valve connection (34.3), wherein the first trailer valve connection (34.1) is connected to the supply connection (2), the second trailer valve connection (34.2) is connected to the trailer control valve connection (30) and the third trailer valve connection (34.3) is connected to a branch line (36) which branches off from a spring brake pressure line (38) connected to the spring actuator connection (4).

19. The electropneumatic parking brake module (1) as claimed in claim 16, wherein in a currentless position, the trailer valve (32) is in the first switching position or in the second switching position.

20. The electropneumatic parking brake module (1) as claimed in claim 1, further comprising an electric control unit (ECU) with an electric connection (40) to receive parking brake signals (HCU) and to provide corresponding switching signals (S1, S2, S3) at least to the pilot control unit (12).

21. The electropneumatic parking brake module (1) as claimed in claim 1, further comprising a pressure sensor (42) which is provided to detect the spring brake pressure (pF) and provide a corresponding pressure signal (SD).

22. An electropneumatic parking brake module (1), comprising:
- a supply connection (2) for connecting a compressed air supply (3),
- a spring actuator connection (4) for connecting a spring brake cylinder (6),
- an inlet-outlet valve unit (10) configured to assume at least a first switching position and a second switching position, and
- an electropneumatic pilot control unit (12) for outputting at least a first control pressure (p1) at the inlet-outlet valve unit (10),
- wherein, in the first switching position of the inlet-outlet valve unit (10), the spring actuator connection (4) is connected to the supply connection (2) for outputting a spring brake pressure (pF), and, in the second switching position of the inlet-outlet valve unit (10), the spring actuator connection (4) is connected to a ventilating connection (14.3) of the inlet-outlet valve unit (10),
- wherein the inlet-outlet valve unit (10) has at least a first 3/2-way valve (14) with exactly two switching positions, and
- wherein the inlet-outlet valve unit (10) is in the second switching position when the first control pressure (p1) is below a first threshold value,
- wherein the inlet-outlet valve unit (10) has a 2/2-way check valve (16).

23. The electropneumatic parking brake module (1) as claimed in claim 22, wherein the first 3/2-way valve (14) serves as an inlet-outlet valve for the spring actuator connection (4) for aerating and ventilating the spring actuator connection (4), and the 2/2-way check valve (16) serves to block an aeration and ventilation of the spring actuator connection (4).

24. An electropneumatic parking brake module (1), comprising:
- a supply connection (2) for connecting a compressed air supply (3),
- a spring actuator connection (4) for connecting a spring brake cylinder (6),
- an inlet-outlet valve unit (10) configured to assume at least a first switching position and a second switching position, and
- an electropneumatic pilot control unit (12) for outputting at least a first control pressure (p1) at the inlet-outlet valve unit (10),
- wherein, in the first switching position of the inlet-outlet valve unit (10), the spring actuator connection (4) is connected to the supply connection (2) for outputting a spring brake pressure (pF), and, in the second switching position of the inlet-outlet valve unit (10), the spring actuator connection (4) is connected to a ventilating connection (14.3) of the inlet-outlet valve unit (10),
- wherein the inlet-outlet valve unit (10) has at least a first 3/2-way valve (14) with exactly two switching positions, and
- wherein the inlet-outlet valve unit (10) is in the second switching position when the first control pressure (p1) is below a first threshold value,
- wherein the electropneumatic pilot control unit (12) has a monostable inlet-outlet valve combination (65) with an inlet valve (70) and an outlet valve (72) for outputting the first control pressure (p1).

25. The electropneumatic parking brake module (1) as claimed in claim 24, further comprising a return line (67) which provides a pressure (pVS) output of the first 3/2-way valve (14) as the first control pressure (p1) at the inlet-outlet valve unit (10).

26. The electropneumatic parking brake module (1) as claimed in claim 25, wherein the pressure (pVS) output of the first 3/2-way valve (14) is provided in a throttled manner as first control pressure (p1) via the return line (67) at the inlet-outlet valve unit (10).

27. The electropneumatic parking brake module (1) as claimed in claim 25, wherein the return line (67) is connected directly to the inlet-outlet valve unit (10).

28. The electropneumatic parking brake module (1) as claimed in claim 25, wherein the inlet connection (22.1) is connected to the supply connection (2), the working connection (22.2) is connected to a second control input (16.3) of a 2/2-way check valve (16) having a first check valve connection (16.1) and a second check valve connection (16.2), wherein the first check valve connection (16.1) is connected to the working connection (14.2), and the second check valve connection (16.2) is connected to the spring actuator connection (4), and the ventilating connection (22.3) is connected to a vent.

29. The electropneumatic parking brake module (1) as claimed in claim 24, wherein the inlet valve (70) has a first inlet valve connection (70.1) connected to the supply connection (2) and a second inlet valve connection (70.2) connected to the inlet-outlet valve unit (10), wherein the first control pressure (p1) can be output at the second inlet valve connection (70.2) by switching the inlet valve (70).

30. The electropneumatic parking brake module (1) as claimed in claim 29, wherein the inlet valve (70) has a third inlet valve connection (70.3) connected to a return line (67) providing a pressure (pVS) output of the first 3/2-way valve (14) as the first control pressure (p1) at the inlet-outlet valve unit (10), wherein, in a first switching position of the inlet valve (70), the second inlet valve connection (70.2) is connected to the first inlet valve connection (70.1), and, in a second switching position of the inlet valve (70), the second inlet valve connection (70.2) is connected to the third inlet valve connection (70.3).

31. The electropneumatic parking brake module (1) as claimed in claim 24, wherein the outlet valve (72) has a first outlet valve connection (72.1) connected to the inlet-outlet valve unit (10) and a second outlet valve connection (72.2) connected to a vent (5) for ventilating the first control pressure (p1).

32. The electropneumatic parking brake module (1) as claimed in claim 31, wherein the outlet valve (72) has a third outlet valve connection (72.3) connected to the return line (67) providing a pressure (pVS) output of the first 3/2-way valve (14) as the first control pressure (p1) at the inlet-outlet valve unit (10), wherein, in a first switching position of the outlet valve (72), the first outlet valve connection (72.1) is connected to the third outlet valve connection (72.3), and, in a second switching position of the outlet valve (72), the first outlet valve connection (72.1) is connected to the second outlet valve connection (72.2).

* * * * *